(12) United States Patent
Brand et al.

(10) Patent No.: US 7,088,813 B1
(45) Date of Patent: Aug. 8, 2006

(54) IDENTIFY CALLER PREFERENCES

(75) Inventors: Thomas E. Brand, Marsfield (AU); Neil Hepworth, Artarmon (AU)

(73) Assignee: Avaya Technology Corp., Basking Ridge, NJ (US)

( * ) Notice: Subject to any disclaimer, the term of this patent is extended or adjusted under 35 U.S.C. 154(b) by 169 days.

(21) Appl. No.: 10/819,491

(22) Filed: Apr. 6, 2004

Related U.S. Application Data

(60) Provisional application No. 60/536,365, filed on Jan. 13, 2004.

(51) Int. Cl.
*H04M 3/00* (2006.01)
(52) U.S. Cl. ............................................. 379/265.02
(58) Field of Classification Search .................. None
See application file for complete search history.

(56) References Cited

U.S. PATENT DOCUMENTS 6,470,080 B1 * 10/2002 Perlmutter .................. 379/219
2005/0128961 A1 * 6/2005 Miloslavsky et al. ........ 370/270

* cited by examiner

*Primary Examiner*—Creighton Smith
(74) *Attorney, Agent, or Firm*—Sheridan Ross P.C.

(57) ABSTRACT

The present invention is directed to a user communication device 174, 180 for interacting with a contact center 100, comprising a user interface operable to initiate a real-time communication with a contact center 100 and an information transmission agent 184 operable, before the real-time communication is routed to a resource associated with a contact center 100, forward to the contact center 100 at least one message comprising personal information 188 of the user. The personal information 188 is not associated with the user communication device 174, 180.

28 Claims, 2 Drawing Sheets

IDENTIFY CALLER PREFERENCES

CROSS-REFERENCE TO RELATED APPLICATION

This application claims the benefits under 35 U.S.C. § 119 of U.S. Provisional Patent Application Ser. No. 60/536,365, filed Jan. 13, 2004, of the same title and to the same inventors, which is incorporated herein by this reference.

FIELD OF THE INVENTION

The present invention is directed generally to providing a contactor's personal information to a contactee and specifically to providing such information as part of a call from the contactor to the contactee.

BACKGROUND OF THE INVENTION

Contact centers are employed by many enterprises to service customer contacts. A typical contact center includes a switch and/or server to receive and route incoming contacts and one or more resources, such as human agents and Interactive Voice Response (IVR) units, to service the incoming contacts. It is common for a contact center to initially assign an incoming contact to an IVR to collect personal information from the contactor, and thereafter assign the contact to be serviced to an agent having the appropriate skills based on the collected personal information. A database can be maintained by the contact center to store the collected personal information about the contactor in anticipation of future contacts by the contactor. The collected personal information can be used to avoid initial assignment to an IVR and effect direct assignment of the contact to an agent, thereby increasing contact center efficiency and promoting customer satisfaction.

The use of an IVR, however, to initially collect information from a contactor is in widespread use. Navigating through an IVR menu structure can be a frustrating experience for contacts, causing a higher incidence of dropped calls and higher levels of customer dissatisfaction. For example, airlines and government agencies typically offer services in multiple languages. It can be time consuming and even annoying to call such a service and have to listen through a list of languages before hearing your own and finally being able to select it. This is especially the case given that the initial greeting is in one default language. In another example, many voice mail servers cater to multiple differing languages by forcing each caller to listen to the same message in the differing languages before the caller can record a message of his or her own.

It is desirable for a contactee to know certain personal information about a contactor as early in the contact as possible to service better the contactor.

SUMMARY OF THE INVENTION

These and other needs are addressed by the various embodiments and configurations of the present invention.

In one embodiment, the present invention is directed to a method for interacting with a contact center in which a user communication device initiates a real-time communication with a contact center and, before the real-time communication is routed to a resource associated with the contact center, the user communication device forwards to the contact center at least one message comprising personal information of the user. "Before routing" means that the information is received as part of the initial call setup message(s), after (or separate from) the call setup message(s), and/or in the same or a separate channel. The channel may be circuit-switched or packet-switched. The personal information is commonly associated with the user but not with the user's communication device. As used herein, "associated with" means that the personal information commonly does not describe the user's communication device and/or its attributes (e.g., address, functions, capabilities features, state, etc). Real-time contacts refer to contacts in which the contacting entity or customer is present during the waiting (or queuing) period and can choose to abandon or disconnect the contact if the call is not serviced within an acceptable period. Common examples include voice calls, VoIP, text-chat, video calls, and the like. Non-real-time contacts refer to contacts in which the contacting entity or customer is unable to abandon or disconnect the contact. Common examples include e-mail, fax, electronic or paper documents, webform submissions, voice messages, and the like.

The personal information can be a variety of user-specific information such as user account number, user language preferences, user financial information, user health information, user policy number, user license number, user religion preference, user sex preference, preferred contact method (e.g., phone, email, instant messaging, etc.), home address, work address, contact telephone numbers (work home, and mobile), email, and instant messaging addresses, and the like.

The personal information can be sent in-band or out-of-band with the real-time communication.

The personal information can be provided to a resource assigned to service the communication before servicing commences to permit the resource to reconfigure the messages presented to the user. For example, an IVR can reconfigure the option menu and/or informational questions otherwise presented to the user based on the received personal information. In one configuration, informational questions seeking information received as part of the personal information are not presented to the user. In another configuration, menu options are omitted based on the received information. In yet another example, a voice mail server or IVR drops messages in alternate languages in favor of the language preference of the user contained in the personal information.

Compared to conventional contact centers, the present invention can provide increased levels of customer satisfaction and decreased contact center service times due to collection of personal information from contactors before servicing of the contact commences. Customers do not have to wait through unnecessary messages and/or provide information through a lengthy IVR menu. The shorter service times can result in shorter wait times for enqueued contacts. Contact centers coupled with caller id and the ability to retrieve customer information from the database using the id can provide some of these advantages for customers who have previously visited the contact center and interacted with contact center resources. However, such contact centers are unable to recognize customer preferences without having any prior knowledge of the customer contactor and customers have to manually enter their information each time that they access a new system.

These and other advantages will be apparent from the disclosure of the invention(s) contained herein.

The above-described embodiments and configurations are neither complete nor exhaustive. As will be appreciated, other embodiments of the invention are possible utilizing,

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

Figure 1:
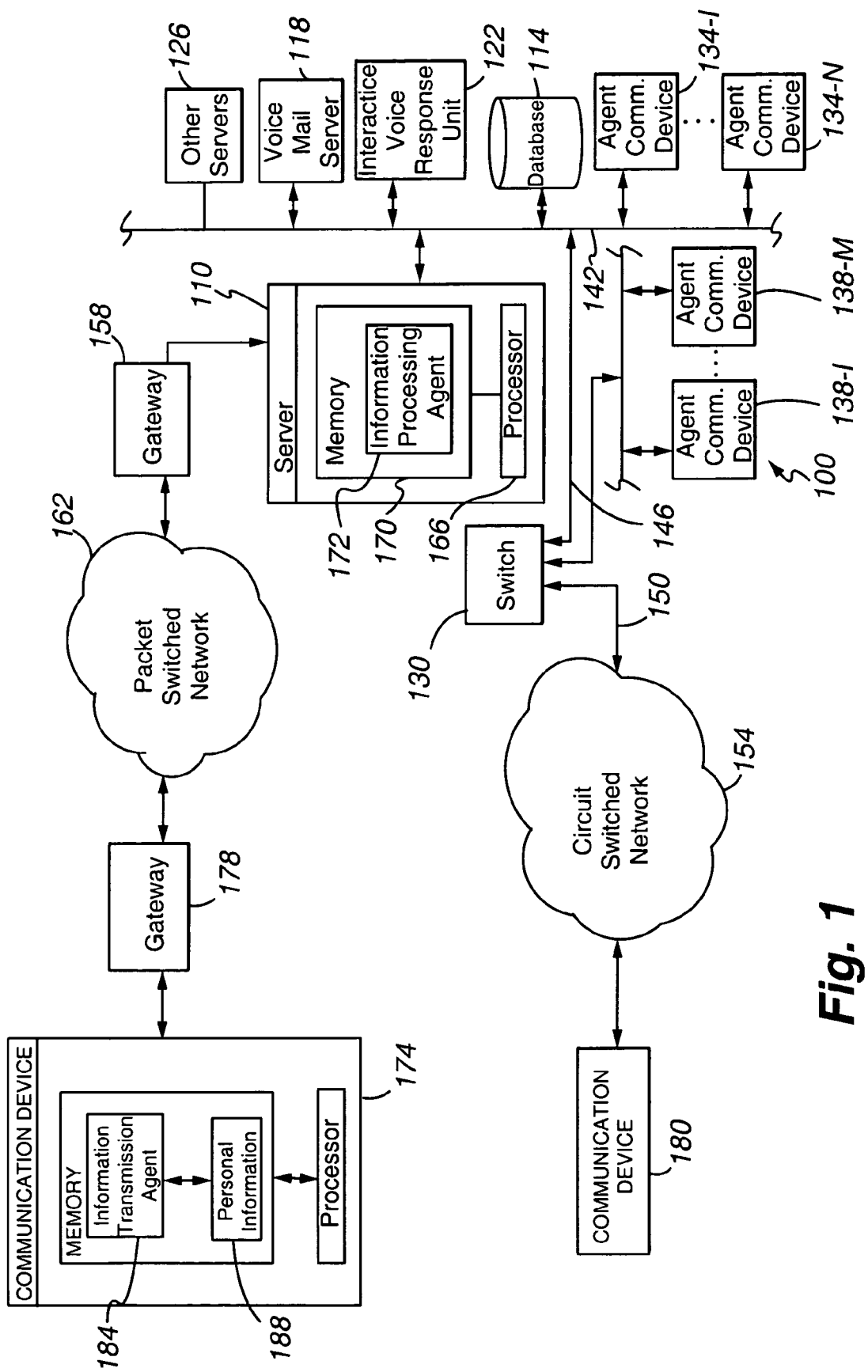
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact, and a plurality of servers, namely a voice mail server 118, an Interactive Voice Response unit or IVR 122, and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN) 142. The servers can be connected via optional communication lines 146 to the switch 130. As will appreciated, the other servers 126 can also include VoIP software, video call software, voice messaging software, an IP voice server, a fax server, a web server, and an email server) and the like. The switch 130 is connected via a plurality of trunks 150 to the Public Switch Telecommunication Network or PSTN 154 and to the second communication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of telecommunications system switch or server, as well as other types of processor-based communication control devices such as media servers, computers, adjuncts, etc.

The server 110 in this implementation includes a processor 166 and a memory 170. The processor 166 may be implemented as a central processing unit (CPU), microprocessor, application-specific integrated circuit (ASIC) or other type of digital data processor as well as various portions or combinations of such elements. The memory may be a random access memory (RAM), a read-only memory (ROM), or combinations of these and other types of electronic memory devices.

The switch 130 and/or server 110 can be any architecture for directing contacts to one or more communication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™, Communication Manager™, S8300™ media server, and/or Interaction Center™. Other types of known switches and servers are well known in the art and therefore not described in detail herein. The switch and server are typically stored-program-controlled systems. The switch and/or server comprises a network interface card (not shown) to provide services to the serviced communication devices. Included in the memory 170 is a contact controller (not shown) for handling incoming and outgoing contacts.

The gateway 158 can be Avaya Inc.'s, G700 Media Gateway™ and may be implemented as hardware such as via an adjunct processor (as shown) or as a chip in the server.

The first communication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and packet-based loudspeaker paging and announcement units.

The second communication devices 138-1, . . . 138-M are circuit-switched. Each of the communication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional communication device endpoints serviced by the switch/server, and the switch/server can direct incoming calls to and receive outgoing calls from these extensions in a conventional manner. The second communication devices can include, for example, wired and wireless telephones, PDAs, pagers, facsimile machines, modems, H.320 video phones and conferencing units, voice messaging and response units, traditional computer telephony adjuncts, and loudspeaker paging and announcement units.

It should be noted that the invention does not require any particular type of information transport medium between switch or server and first and second communication devices, i.e., the invention may be implemented with any desired type of transport medium as well as combinations of different types of transport media.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first communication device 174 via a gateway 178, and the circuit-switched network 154 with an external second communication device 180. These communication devices are referred to as "external" in that they are not directly supported as communication device endpoints by the switch or server. The communication devices 174 and 180 are an example of devices more generally referred to herein as "external endpoints."

In a preferred configuration, the server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the invention to any particular arrangement of elements.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the central server 110 forwards instructions to the component to forward the contact to a specific first or second communication device 134, 138 associated with a selected agent. The server 110 distributes and connects these contacts to communication devices of available agents based on a set of predetermined criteria. When the central server 110 forwards a voice contact to an agent, the central server 110 also forwards information from databases 114 to the agent's computer work station for viewing (such as by a pop-up display) to permit the agent to better serve the customer. The agents process the contacts sent to them by the central server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

The server 110 includes an information processing agent 172 which interacts with an information transmission agent 184 in the external communication devices 174 and 180. The information transmission agent 184 provides personal information 188 associated with a user of the external communication device 174, 180 to the information processing agent 172 as part of a communication, typically a voice communication between the user and a contact center resource. The information processing agent 172 reformats the information and provides the information to the appropriate contact center resource, such as voice mail server 118, IVR unit 122, and/or agent communication device 134 or 138.

The personal information 188 can be any information associated with the user. Examples of personal information include user name, user social security number, user account number, user preferences (such as language to be used for interacting with the user, desired sex of servicing agent, level of proficiency in a language, and religion preference), financial information (such as net worth, gross annual earnings, net annual earnings, account balances, etc.), number of family members and/or their ages, sex of user, age of user, health information (allergies, medical history, current medical condition, etc.), number or electronic address to which a return contact is to be directed (which is different from the number of electronic address of the contacting user communication device), user business address, user home address, user policy number, user license number, and the like. The personal information normally is not information associated with the communication device itself, such as the device's capabilities, number, electronic address, state, and the like.

The information transmission agent 184 is preferably a software module in the communication device but may be a hardware component, such as a logic circuit, or information stored on the user's communication device by or at the request of the contact center, such as a cookie.

The personal information 188 is typically provided by the information transmission agent 184 to the information processing agent 172 before completion of, after completion of, or during call set up. Typically, the information will be transmitted immediately after the completion of call set up at the command of the user. For example, the user can press a specified button or key on the communication device 174, 180 to authorize transmission of the information.

The personal information 188 may be transmitted by any suitable protocol for the network carrying the transmission either in-band or out-of-band with the communication medium carrying the contact initiated by the user. For example, the personal information may be transmitted in-band and/or out-of-band using the TTY (TeleTypeWriter) protocol, DTMF signals, an SMS message, TCP/IP suite of protocols, H.323, the Session Initiation Protocol or SIP, the Lightweight Directory Access Protocol or LDAP and SMTP.

In one configuration, selected items of the personal information are transmitted using a query/response protocol. For example, the information processing agent 172 would forward to the information transmission agent 184 or vice versa a query respecting certain items of personal information. Only those items of personal information 188 from among all of the possible stored items of personal information 188 would be sent to the processing agent 172. This configuration has the added advantage of maintaining the confidentiality of personal information which is not needed as part of the current transaction. As part of a contact with a vendor, for instance, only the user's home or mailing address, home telephone number, and credit card information are required by the vendor rather than all of the user's bank account and other financial information.

In another configuration, a user selected set of personal information 188 is forwarded to the information processing agent 172 all at once and not in response to a specific query. The processing agent 172 would ignore unnecessary information. The type of information ignored can be based on any suitable parameter such as destination address, contact type, the purpose of the contact, the identity of the customer, and the like.

In another configuration, the user selects, for one or more third party numbers or addresses, the information to be provided when the number/address is called by the user. Differing numbers/addresses can have differing sets of selected personal information.

Figure 2:
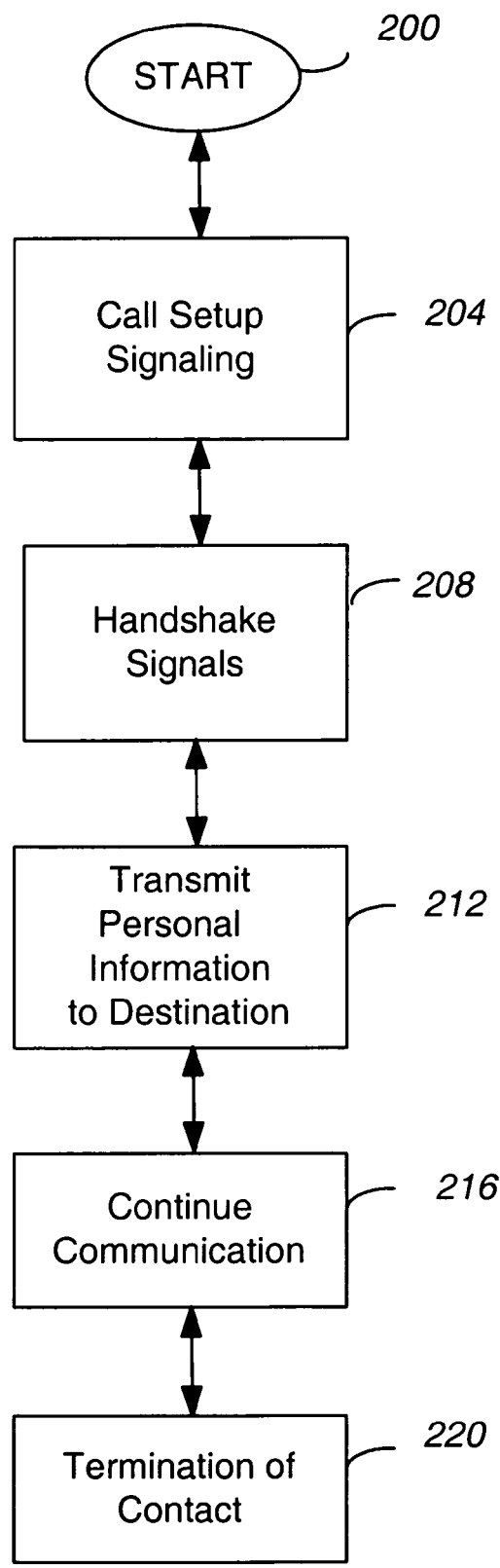
FIG. 2 is a flow chart depicting the operation of the information transmission agent in an embodiment of the present invention.

The operation of the agents 172 and 184 will now be described with reference to FIG. 2.

In step 200, the user initiates a live or real-time contact with the contact center 100. This is typically effected by dialing a telephone number or typing an electronic address, such as an e-mail address or instant message address.

In step 204, communication set up signals are exchanged between the contacting communication device 174 or 180 and the contact center 100 or a resource thereof.

In step 208, after the communication set up is completed, the contacting communication device 174 or 180 and contact center 100 exchange handshake signals to ensure that each of the communication devices 174 or 180 has the necessary capabilities to exchange the personal information of the contactor/user. For the TTY protocol, the handshake signals can be a special set of characters. One set of characters sent in one direction between the device 174 or 180 and contact center 110 would effectively ask "Do you understand?" and the second different set of characters sent in the other direction would effectively respond "Yes." Alternately, the information could be sent and if the receiving device lacks the necessary capabilities to exchange the information, the information would be dropped.

If the handshake is completed successfully (meaning that the correct response is received), the information transmission agent 184 in step 212 transmits the personal information to the information processing agent 172. The preference fields have a standard order to facilitate processing. For example, the first field could be language preference code, the second field religion code, the third field user sex code, the fourth field user address, etc. The fields would be separated by spaces. Alternatively, the fields could comprise a field identifier for each field and could be in a nonstandardized order. The field identifiers could be letter and/or number pairings. The transmission can be automatic or triggered by the user pressing one or more specific keys or buttons on the communication device 174 or 180.

In a preferred configuration, standard codes are used to identify the contents of each field. For example, the language preference would be indicated by a corresponding ISO 639-2 country code.

The processing agent 172 receives the transmission, parses the various fields, extracts the desired information, and formats and sends the information to the contact center resource to service the contact. For example, the information could be sent to the IVR, which would skip the user questions seeking the provided information. This would cause the IVR session to be much quicker or even be avoided altogether. In another example, the information could be sent to voice mail server 118, which would only provide the user with standard voice mail messages in the language specified. In yet another example, the information would be provided alone or combined with other information obtained from the database 114 to an agent in a pop up on the agent's workstation.

In step 216, the communication between the user and assigned contact center resource is continued until termination in step 200.

A number of variations and modifications of the invention can be used. It would be possible to provide for some features of the invention without providing others.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for servicing a contact, comprising:
    setting up a live voice communication between a user communication device and a contact center;
    before the live voice communication is initially routed to a resource associated with the contact center, receiving from the user communication device at least one message comprising personal information of the user, wherein the personal information is not associated with the user communication device;
    configuring a set of messages to be provided by a selected resource to the user of the communication device; and
    thereafter routing the live voice communication to the selected resource.

2. The method of claim 1, wherein the user communication device is an external endpoint, wherein the personal information does not describe the user communication device and/or the device's attributes, wherein the live voice communication is one of a voice call, text chat, and a video call, and further comprising:
    providing the received personal information to the selected resource assigned to service the live communication.

3. The method of claim 2, wherein the resource is an Interactive Voice Response (IVR) unit and wherein the configuring step comprises:
    omitting at least a portion of a menu normally presented by the IVR to users being serviced by the IVR, wherein the omitted at least a portion of the menu is intended to collect the personal information already received by the contact center in the receiving step.

4. The method of claim 1, wherein the personal information is at least one of user account number, user social security number, user family information, user language preferences, user financial information, user health information, user policy number, user license number, user religion preference, user sex preference, preferred contact method, and address information and further comprising:
    the user communication device selecting a subset of personal information from among a set of personal information to transmit to the contact center, the selection being based on at least one of a user command, a query received from the contact center, and a destination address of the contact center.

5. The method of claim 1, wherein the personal information is transmitted to the contact center out-of-band.

6. The method of claim 1, wherein the personal information is received as part of the initial call setup messages, wherein the live communication is circuit-switched and wherein, in the configuring step, at least one of a structure and attribute of the set of messages is selected based on the received personal information.

7. The method of claim 1, wherein the resource is a voice messaging server and wherein the personal information is transmitted using one of the Teletypewriter protocol and DTMF signals.

8. The method of claim 1, wherein the personal information is language preference and the resource is at least one of a voice mail server and Interactive Voice Response (IVR) unit and further comprising:

in the interaction with the user, the at least one of a voice mail server and IVR omitting messages in languages other than the language preference of the user.

9. A computer readable medium comprising executable instructions to perform the steps of claim 1.

10. A method for interacting with a contact center, comprising:

a user communication device initiating a real-time communication with a contact center;

receiving a user command to forward to the contact center at least one message comprising personal information of the user; and before the real-time communication is routed to a resource associated with the contact center, the user communication device forwarding to the contact center the at least one message comprising personal information of the user, wherein the personal information is not associated with the user communication device.

11. The method of claim 10, further comprising:

based on the destination address of the real-time communication received from the user in the initiating step, selecting, from among a plurality of items of personal information, the items of personal information included in the at least one message.

12. The method of claim 10, further comprising:

the contact center providing the received personal information to the resource assigned to service the real-time communication.

13. The method of claim 12, wherein the resource is an Interactive Voice Response (IVR) unit and further comprising:

in the interaction with the user, the IVR omitting at least a portion of a menu normally presented by the IVR to users being serviced by the IVR, wherein the omitted at least a portion of the menu is intended to collect the personal information already received by the contact center in the receiving step.

14. The method of claim 10, wherein the personal information is at least one of user account number, user language preferences, user financial information, user health information, user policy number, user license number, user religion preference, user sex preference, preferred contact method and address information.

15. The method of claim 10, wherein the personal information is transmitted to the contact center in-band.

16. The method of claim 10, wherein the real-time communication is circuit-switched.

17. The method of claim 10, wherein the personal information is transmitted using one of the Teletypewriter protocol and DTMF signals.

18. The method of claim 10, wherein the personal information is language preference and the resource is at least one of a voice mail server and Interactive Voice Response (IVR) unit and further comprising:

in the interaction with the user, the at least one of a voice mail server and IVR omitting messages in languages other than the language preference of the user.

19. A compute readable medium comprising executable instructions to perform the steps of claim 10.

20. A user communication device for interacting with a contact center, comprising:

a user interface operable to initiate a real-time communication with a contact center; and an information transmission agent operable, before the real-time communication is routed to a resource associated with a contact center, to receive a user command to forward to the contact center at least one message comprising personal information of the user, wherein the personal information is not associated with the user communication device, and, in response to the user command, forward the at least one message to the contact center.

21. The device of claim 20, wherein the agent is operable, based on the destination address of the real-time communication received from the user in the initiating step, select, from among a plurality of items of personal information, the items of personal information included in the at least one message.

22. The device of claim 20, wherein the contact center comprises:

an information processing agent operable to provide the received personal information to the resource assigned to service the real-time communication.

23. The device of claim 22, wherein the resource is an Interactive Voice Response (IVR) unit and wherein, in the interaction with the user, the IVR omits at least a portion of a menu normally presented by the IVR to users being serviced by the IVR, wherein the omitted at least a portion of the menu is intended to collect the personal information already received by the contact center in the receiving step.

24. The device of claim 20, wherein the personal information is at least one of user account number, user language preferences, user financial information, user health information, user policy number, user license number, user religion preference, user sex preference, preferred contact method and address information.

25. The device of claim 20, wherein the personal information is transmitted to the contact center in-band.

26. The device of claim 20, wherein the real-time communication is circuit-switched.

27. The device of claim 20, wherein the personal information is transmitted using one of the Teletypewriter protocol and DTMF signals.

28. The device of claim 20, wherein the personal information is language preference and the resource is at least one of a voice mail server and Interactive Voice Response (IVR) unit and, in the interaction with the user, the at least one of a voice mail server and IVR omits messages in languages other than the language preference of the user.

* * * * *